United States Patent Office 3,531,498
Patented Sept. 29, 1970

---

3,531,498
PROCESS FOR THE PREPARATION OF
2-CARBOXYTHIOLANES
Pierre Legendre, Pau, France, assignor to Societe Nationale des Petroles d'Aquitaine, Courbevoie, France
No Drawing. Filed May 6, 1968, Ser. No. 727,029
Claims priority, application France, May 8, 1967,
105,624
Int. Cl. C07d 63/04
U.S. Cl. 260—332.2                 5 Claims

ABSTRACT OF THE DISCLOSURE

This invention has to do with the preparation of 2-carboxythiolanes by subjecting a 2-trihalomethyl-thiolane to hydrolysis with an organic aliphatic acid and an alkali metal salt of a weak acid.

BACKGROUND OF THE INVENTION

The thiolane-2-carboxylic acid

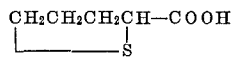

and its homologues are useful industrially, particularly as adjuvants for metal electrodeposition baths, or as initial material for the manufacture of the solvent tetramethylene sulphones, carrying an ester function on the carbon in the 2-position. It is thus of interest to be able to prepare these acids economically. Now the known method, which consists in reducing the thiophene carboxylic acid by sodium amalgam ("The Chemistry of Heterocyclic Compounds," 1952, pp. 78–79), is not really practical, particularly on account of the cost of the materials which are used. These and other difficulties experienced with the prior art devices have been obviated in a novel manner by the present invention.

It is, therefore, an outstanding object of the invention to provide a process for the preparation of 2-carboxythiolanes which makes it possible to obtain the acids in question economically, starting with materials which have become readily available in industry at the present time.

Another object of this invention is the provision of the preparation of thiolane-2-carboxylic acid from a 2-trihalomethyl thiolane, which, in turn, can be obtained economically from a substance which is readily available, i.e., a 5,5-dihalopentene which carries a thiol or thioacyl group in the 1-position.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

In general, the invention consists in moderately heating the halogenated derivative of the thiolane with an aqueous solution of a mineral or organic acid. It is possible, for instance, to employ aqueous solutions of various concentrations of acids, such as sulfuric, perchloric, phosphoric, formic, chloracetic, propionic, and the like. More specifically, good yields of 2-thiolane carboxylic acid are obtained by the use of mixtures of organic acid with an alkali salt of this acid. In particular, good results are obtained when a 2-trihalomethyl thiolane is treated with a mixture of acetic acid and sodium acetate. Under these conditions, the yield of 2-thiolane carboxylic acid, with respect to the 2-trihalomethyl thiolane, can reach 50%.

DESCRIPTION OF THE PREFERRED EMBODIMENT

Generally speaking, the reaction which leads to the formation of the desired thiolane carboxylic acid can be written:

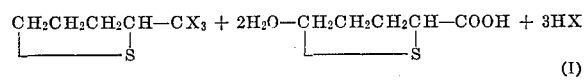

(I)

in which X represents a halogen, which is usually bromine or chlorine and especially the latter, the derivatives of which are the most common and economical.

The content of water in the hydrolysis medium, which contains the organic acid and an alkali metal salt of organic acid, is preferably not excessive. It is generally from 10 to 70% by weight of this medium, and best of all from 20 to 50%; it is to be understood that there should be at least 2 mols of $H_2O$ per mol of the trihalomethyl thiolane which is being used; generally, the proportion of water is from 2 to 6 and especially 3 to 5 mols of $H_2O$ per mol of trihalomethyl thiolane.

The preferred quantities of acid are from 1 to 3 equivalents, and those of alkali salt from 0.6 to 2 equivalents per mol of trihalomethyl thiolane which is to be hydrolyzed. With regard to the ratio between the quantity of alkali metal salt and the quantity of the acid, this can vary within wide limits, but it is preferable to have 0.3 to 1 equivalent of salt per equivalent of acid.

Among the acids capable of being employed for carrying out the hydrolysis according to the invention, there are to be considered, for example, the following acids: acetic, propionic, butyric, isobutyric, valeric, isovaleric, monochloracetic, dichloracetic, monochloropropionic, trichlorobutyric, lactic, oxalic, succinic, sulpho-acetic, formic, and like acids. However, since acetic acid is the most easily available and the least expensive of all the organic acids, it is acetic acid which is to be particularly recommended for an industrial production, according to the invention.

The salts of the alkali metals, particularly of sodium or potassium, of which the addition to the acid contributes to considerably increasing the yield of thiolane carboxylic acid, can be salts of relatively weak acids. It is thus possible to use the borates, phosphates, sulphites, formates, acetates, propionates, butyrates, lactates, oxalates, tartrates, etc. Here also the acetates and particularly sodium acetate, have the merit of being very economical, while giving good results; sodium acetate has in addition the advantage of being found commercially in a crystallized form with 3 mols of water $$(NaC_2H_3O_2 \cdot 3H_2O)$$

which supplies just the proportion of water adequate for the hydrolysis to the reaction medium.

Although it is the thiolane-2-carboxylic acid of the formula given in reaction (I) above, which constitutes the main product of the invention, several of its homologues can be prepared by the same process. It is sufficient that, in the 2-trihalomethyl thiolane, one or more hydrogen atoms of the 3 to 5 positions are substituted by radicals, and particularly by alkyl radicals. By way of example, the most usual substituents are linear or branched alkyls containing 1 to 18 carbon atoms, such as especially methyl, ethyl, propyl, isopropyl, butyls, hexyls, dodecyls, etc. It is thus possible for the 2-trichloromethyl-5-methyl-thiolane to be subjected to hydrolysis in order to prepare the 2-carboxy-5-methyl-thiolanic acid; the hydrolysis of the 2-trichloromethyl-3,4-dipropyl thiolane gives the 2-carboxy-3,4-dipropyl thiolanic acid, etc. The hydrolysis, according to the invention, is preferably effected at a temperature from 30° to 100° C.

EXAMPLE 1

The initial material was a crude 2-trichloromethyl thiolane which had been obtained by the action of 42.6 g. of 1-thioacetyl-5,5-dichloropent-4-ene with 15 g. of chlorine at 20° for 2½ hours. After the formed acetyl chloride was eliminated by vacuum distillation in the cold, the remaining product had added thereto 30 g. of sodium acetate crystallized with 3 mols of $H_2O$ and 20 g. of acetic acid. The mixture was then progressively heated so that the temperature was raised from 40° to 80° C. in 3 hours.

The reaction medium was taken up in water and then extracted with ether. The ethereal phase was washed with normal sodium hydroxide solution. The alkali phase thus obtained was acidified with 10% HCl and subjected to a fresh extraction with ether. The ethereal solution was dried over anhydrous sodium sulphate, after which the ether was driven off by distillation.

8 g. of 2-thiolane carboxylic acid of the formula

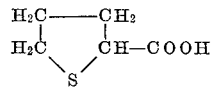

and melting at 49–50° C. were obtained. The yield of this acid was found to be 30% with respect to the initial thioacetyl and about 50% related to the 2-trichloromethyl thiolane.

EXAMPLE 2

22 g. of 2-trichloromethyl-5-methyl thiolane (0.1 mol)

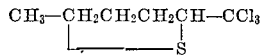

were mixed with 21 g. of sodium acetate $$(NaC_2H_3O_2 \cdot H_2O)$$

and 15 g. of acetate acid. The mixture was heated progressively in 3½ hours up to 85° C., after which the reaction medium was treated as in Example 1. There were obtained 7.8 g. (0.053 mol) of 2-carboxy-5-methyl-thiolanic acid

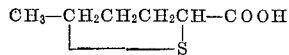

with a yield of 53% relatively to the initial material.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for the preparation of a thiolane, the carbon atom in position 2 of which bears a carboxylic group, consisting of the steps of subjecting a 2-trihalomethyl-thiolane wherein the halo is chloro or bromo to hydrolysis by mixing it and heating at 30° to 100° C. with an organic aliphatic acid having 1 to 6 carbon atoms, a salt of alkali metal of a weak acid, and an amount of water of at least 2 moles per mole of the 2-trihalomethyl-thiolane, and comprised between 10% and 70% by weight of the total quantity of said acid and said salt, and then separating the thiolane-2-carboxylic acid formed from the reaction medium.

2. A process as recited in claim 1, wherein the 2-trihalomethyl-thiolane is 2-trichloromethyl-thiolane, the aliphatic acid is acetic acid, the salt is sodium acetate and the amount of water is of 3 moles per mole of $CH_3COONa$, while the proportion of sodium acetate is 0.3 to 1 equivalent per equivalent of acetic acid, the heating being effected at 40° to 80° C.

3. A process as recited in claim 1, wherein at least one of the hydrogen atoms of the thiolane is substituted with an alkyl radical having 1 to 18 carbon atoms.

4. A process as recited in claim 1, wherein said thiolane has 1 to 2 hydrogen atoms substituted by alkyl radicals having 1 to 4 carbon atoms.

5. A process as recited in claim 2, wherein said thiolane has 1 to 2 hydrogen atoms substituted by alkyl radicals having 1 to 4 carbon atoms.

References Cited

Hartough: Thiophene and Its Derivs. (Interscience, New York, 1952), pp. 78–79.

HENRY R. JILES, Primary Examiner

C. M. SHURKO, Assistant Examiner